Jan. 29, 1957                A. BOOM                2,779,489
                      LOADING CHUTE FOR TRUCKS
Filed Nov. 18, 1954                          2 Sheets-Sheet 1

Aaron Boom
    INVENTOR.

Jan. 29, 1957
A. BOOM
2,779,489
LOADING CHUTE FOR TRUCKS
Filed Nov. 18, 1954
2 Sheets-Sheet 2
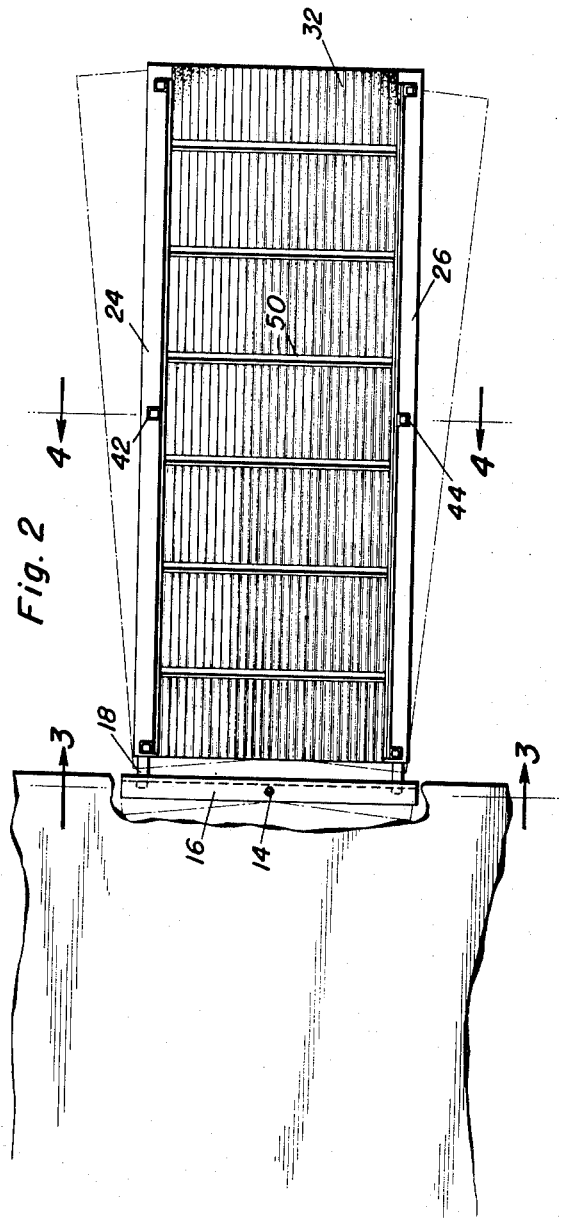
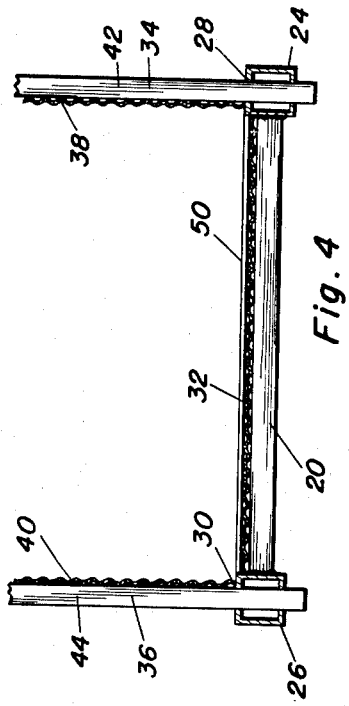
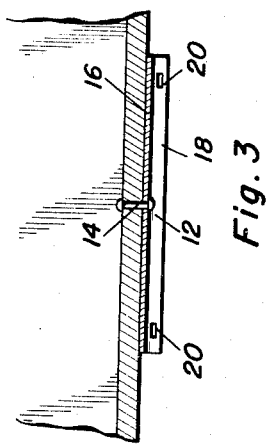
Aaron Boom
INVENTOR.

United States Patent Office 2,779,489
Patented Jan. 29, 1957

2,779,489

LOADING CHUTE FOR TRUCKS

Aaron Boom, Valley City, N. Dak.

Application November 18, 1954, Serial No. 469,819

1 Claim. (Cl. 214—85)

This invention relates to a loading chute and more particularly to a collapsible chute adapted to be used in loading and unloading livestock to and from a truck.

The primary object of the present invention resides in the provision of a loading chute which is adapted to be easily attached to any type of conventional vehicle in a simple and convenient manner and which may be readily dissembled and stored on suitable hangers carried by the truck or otherwise arranged in very small compass.

A further object of the invention lies in the provision of means for enabling the relative rotation of the chute with respect to the truck to thereby render the loading and unloading of cattle and other livestock more convenient.

The construction of this invention especially features the utilization of an angle shaped mounting bar which is rotatably mounted by means of a rivet or pin on the rear end of a truck or like vehicle. The mounting bar is provided with a vertical flange having apertures therethrough for receiving hook members appended to the floor of the chute.

Still further objects and features of this invention reside in the provision of a loading chute that is strong and durable, which is extremely light in weight thereby permitting more convenient handling and efficient loading and unloading, which is inexpensive to construct and easy to fabricate.

These, together with the various ancillary objects and features of the invention which will become apparent as the following description proceeds, are attained by this loading chute, a preferred embodiment of which has been illustrated in the accompanying drawings by way of example only, wherein:

Figure 2 is a top plan view of the loading chute with a portion of the truck to which the chute is attached being broken away for detail and illustrating in phantom lines the manner in which the chute may be rotated to facilitate loading;

Figure 3 is a vertical sectional view as taken along the plane of line 3—3 in Figure 2; and Figure 4 is an enlarged vertical sectional view as taken along the plane of line 4—4 in Figure 2.

Figure 1:
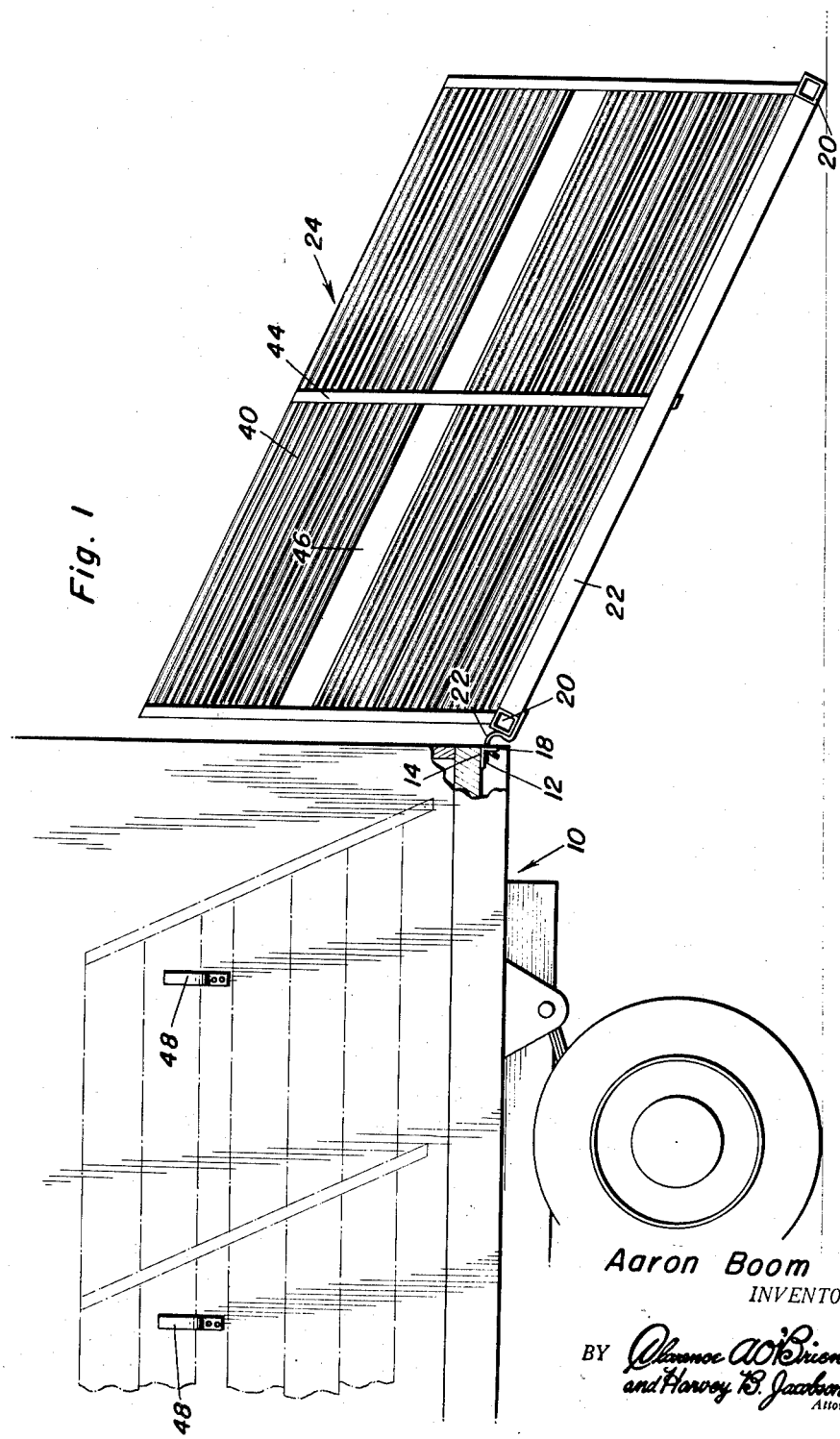
Figure 1 is a side elevational view of the loading chute shown operatively secured in association with a truck with parts of the truck being broken away to show the construction of the invention in detail.

With continuing reference to the accompanying drawings wherein like reference numerals designate similar parts throughout the various views, reference numeral 10 generally designates any conventional type of vehicle such as a truck or a tractor-trailer combination which has affixed thereto by means of a rivet 12 an angle shaped mounting bar 14. The rivet 12 forms a pivot joint for the mounting bar 14 and it is noted that the mounting bar 14 is provided with a horizontal flange 16 through which the rivet or pin 14 extends. The angle bar 12 is further provided with a vertical flange 18 having spaced slots 20 therein adapted to receive hook members 22 which may be welded or otherwise affixed to the tubular frame 20 of the ramp floor 22 of the loading chute generally designated by reference numeral 24.

The ramp floor 22 of the loading chute 24 includes a peripheral tubular frame 20 which is preferably square in cross section and which includes spaced tubular members 24 and 26 provided with suitable slots 28 and 30 therethrough, respectively. Welded, or otherwise affixed to the tubular frame 20, is a panel 32 of sheet metal which is preferably corrugated.

Side walls 34 and 36 are provided for the chute and these side walls include panels 38 and 40 of corrugated sheet metal which is comparatively light in weight. The corrugated metal panels 38 and 40 are rigidified by spaced stakes 42 and 44. The lower end of the stakes are receivable in the apertures 28 and 30 in the tubular members 24 and 26 to hold the side walls 34 and 36 in an upright position. It is to be noted that the corurgated metal panels 38 and 40 may be arranged in sections leaving spaces such as are indicated at 46 therebetween whereby hangers 48 appended to the body of the vehicle 10 may be utilized to support the side walls 34 and 36 in a convenient manner. Further, with the stakes 42 and 44 removed from the slots 28 and 30, the entire loading chute may be collapsed to a very small compass.

It is noted that the floor panel 32 may be rigidified by suitable braces 50 as may be desired.

In use, because of the extremely light weight of the chute, it may be readily moved from one location to another and may be readily assembled in a convenient manner. The floor section 32 may be secured by merely engaging the hooks 22 within the apertures 20 and then the side walls 34 and 36 may be readily fitted into place with the stakes 42 and 44 being received in the slots 28 and 30.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claim.

What is claimed as new is as follows:

A collapsible livestock chute comprising a ramp floor, side walls detachably secured to said ramp floor, hook members secured to the front end of said ramp floor, an angle shaped mounting bar adapted to be attached to a vehicle, said mounting bar including a vertical flange, said vertical flange having apertures therethrough receiving said hook members, said mounting bar having a horizontal flange, and means extending through said horizontal flange for rotatably mounting said mounting bar, said ramp floor including spaced tubular members interconnected by a corrugated sheet panel, said tubular members having slots therethrough, said side walls including corrugated sheet panels rigidified by vertically extending stakes, said stakes being receivable in said slots.

References Cited in the file of this patent

UNITED STATES PATENTS

| | | |
|---|---|---|
| 1,224,045 | Titsworth | Apr. 24, 1917 |
| 1,383,080 | Deno et al. | June 28, 1921 |
| 1,384,713 | Stephens | July 12, 1921 |
| 1,724,548 | Barcus | Aug. 13, 1929 |
| 2,228,946 | Carter | Jan. 14, 1941 |
| 2,584,396 | Naekel | Feb. 5, 1952 |